(12) United States Patent
Moriyama

(10) Patent No.: US 10,418,820 B2
(45) Date of Patent: Sep. 17, 2019

(54) POWER SUPPLY APPARATUS, POWER SUPPLY SYSTEM, AND CONTROL METHOD OF POWER SUPPLY APPARATUS

(71) Applicant: KYOCERA CORPORATION, Kyoto-shi, Kyoto (JP)

(72) Inventor: Yuichi Moriyama, Yokohama (JP)

(73) Assignee: KYOCERA Corporation, Kyoto (JP)

(*) Notice: Subject to any disclaimer, the term of this patent is extended or adjusted under 35 U.S.C. 154(b) by 322 days.

(21) Appl. No.: 15/522,390

(22) PCT Filed: Oct. 27, 2015

(86) PCT No.: PCT/JP2015/005400
§ 371 (c)(1),
(2) Date: Apr. 27, 2017

(87) PCT Pub. No.: WO2016/067603
PCT Pub. Date: May 6, 2016

(65) Prior Publication Data
US 2017/0317501 A1    Nov. 2, 2017

(30) Foreign Application Priority Data

Oct. 27, 2014    (JP) .................................. 2014-218599

(51) Int. Cl.
*H02J 3/38* (2006.01)
*H02J 3/46* (2006.01)
*H02J 7/35* (2006.01)

(52) U.S. Cl.
CPC ................ *H02J 3/383* (2013.01); *H02J 3/38* (2013.01); *H02J 3/381* (2013.01); *H02J 3/387* (2013.01);
(Continued)

(58) Field of Classification Search
CPC ..... H02J 3/383; H02J 3/38; H02J 3/381; H02J 3/46; H02J 7/35; H02J 2003/388
See application file for complete search history.

(56) References Cited

U.S. PATENT DOCUMENTS

2011/0115295 A1* 5/2011 Moon ........................ H02J 3/32
307/65

FOREIGN PATENT DOCUMENTS

JP    2008-22650 A    1/2008
JP    2013-51879 A    3/2013
(Continued)

OTHER PUBLICATIONS

International Search Report dated Jan. 12, 2016, issued by Japan Patent Office for International Application No. PCT/JP2015/005400.

(Continued)

*Primary Examiner* — Carlos Amaya
(74) *Attorney, Agent, or Firm* — Procopio Cory Hargreaves and Savitch LLP

(57) ABSTRACT

A power supply apparatus of the disclosure is interconnected to the grid together with a power generation apparatus, and configured to control a solar cell and a storage battery. The power supply apparatus includes an inverter for converting DC power from the solar cell and the storage battery into AC power, a first relay for switchover a connection between the inverter and the grid, an AC-DC converter capable of converting AC power from the power generation apparatus into DC power and supplying the DC power to the storage battery during an grid-independent operation, and a controller for controlling such that, at the time of recovery of the grid from the power outage, the AC-DC converter starts
(Continued)

operating, that the first relay is switched on, and that the AC-DC converter keeps operating until a reverse power flow to the grid is detected.

12 Claims, 6 Drawing Sheets

(52) U.S. Cl.
CPC .................................. *H02J 3/46* (2013.01); *H02J 7/35* (2013.01); *H02J 2003/388* (2013.01)

(56) References Cited

FOREIGN PATENT DOCUMENTS

| | | |
|---|---|---|
| JP | 2014-161173 A | 9/2014 |
| WO | 2013/046685 A1 | 4/2013 |
| WO | 2014/051075 A1 | 4/2014 |

OTHER PUBLICATIONS

Written Opinion of the International Searching Authority dated Jan. 12, 2016, issued by Japan Patent Office for International Application No. PCT/JP2015/005400.

* cited by examiner

POWER SUPPLY APPARATUS, POWER SUPPLY SYSTEM, AND CONTROL METHOD OF POWER SUPPLY APPARATUS

CROSS REFERENCE TO RELATED APPLICATION

This application claims priority to and the benefit of Japanese Patent Application No. 2014-218599 (filed on Oct. 27, 2014), the entire contents of which are incorporated herein by reference.

TECHNICAL FIELD

The disclosure relates to a power supply apparatus, a power supply system, and a control method of the power supply apparatus.

BACKGROUND

In recent years, from a viewpoint of an improvement in energy security independent of petroleum and use of clean energy for exhaust gas free of nitrogen oxides, there has been an increasing expectation for a power generation system having a fuel cell for generating power from an electrochemical reaction of gas. Also, there is proposed a number of fuel cell power supply systems using the fuel cell. For example, PLT 1 set forth below discloses a grid-independent operation aiding apparatus for aiding a grid-independent operation of the fuel cell at the time of power outage.

CITATION LIST

Patent Literature

PLT 1: JP-A-2013-51879

SUMMARY

Technical Problem

Incidentally, the power system for centrally managing and operating a storage battery together with the fuel cell may effectively use the power generated by the fuel cell by charging the storage battery with the power generated by the fuel cell during a grid-independent operation. Also, it has been desired to effectively use the power generated by the fuel cell also when a grid recovers from the power outage.

Therefore, it could be helpful to provide a power supply apparatus capable of effectively utilizing the power generated by the fuel cell at the time of recovery of the grid from the power outage, a power supply system, and a control method of the power supply apparatus.

Solution to Problem

A power supply apparatus of the disclosure is a power supply apparatus interconnected to a grid together with a power generation apparatus, and configured to control a solar cell and a storage battery, the power supply apparatus includes an inverter configured to convert DC power from the solar cell and the storage battery into AC power, a first relay configured to switch on/off a connection between the inverter and the grid, an AC-DC converter capable of converting AC power from the power generation apparatus into DC power and supplying the DC power to the storage battery during a grid-independent operation, and a controller configured to control, at the time of recovery of the grid from power outage, such that the AC-DC converter starts operating, that the first relay is switched on, and that the AC-DC converter keeps operating until a reverse power flow to the grid is detected.

Also, a power supply system of the disclosure is a power supply system interconnected to a grid, the power supply system including a power generation apparatus, a solar cell, a storage battery, and a power supply apparatus, wherein the power supply apparatus includes an inverter configured to convert DC power from the solar cell and the storage battery into AC power, a first relay configured to switch on/off a connection between the inverter and the grid, an AC-DC converter capable of converting AC power from the power generation apparatus into DC power and supplying the DC power to the storage battery during a grid-independent operation, and a controller configured to control, at the time of recovery of the grid from power outage, such that the AC-DC converter starts operating, that the first relay is switched on, and that the AC-DC converter keeps operating until a reverse power flow to the grid is detected.

Further, a control method of a power supply apparatus interconnected to a grid together with a power generation apparatus, and configured to control a solar cell and a storage battery, the control method includes, at the time of recovery of the grid from power outage, a step of converting AC power from the power generation apparatus into DC power and supplying the DC power to the storage battery, a step of switching on a connection between an inverter that converts DC power from the solar cell and the storage battery into AC power and the grid, and a step of controlling so as to maintain an operation to convert the AC power from the power generation apparatus into the DC power until a reverse power flow to the grid is detected.

The power supply apparatus, the power supply system, and the control method of the power supply apparatus of the disclosure enable effective use of the power generated by the fuel cell at the time of recovery of the grid from the power outage.

DETAILED DESCRIPTION

Hereinafter, an embodiment of the disclosure will be described with reference to the accompanying drawings.

First, a power supply system according to one embodiment will be described. The power supply system according to the present embodiment, in order to supply power in addition to power supplied from a grid (a commercial power line), includes a distributed power source for supplying power which can be sold and a distributed power source for supplying power which cannot be sold. The distributed power source for supplying the power which can be sold includes, for example, a system for supplying power by using photovoltaic power generation. On the other hand, the distributed power source for supplying the power which cannot be sold includes, for example, a storage battery system capable of charging and discharging power, and a fuel cell system provided with a fuel cell such as SOFC (Solid Oxide Fuel Cell). In the present embodiment, the power supply system includes a solar cell serving as the distributed power source for supplying power which can be sold, and a storage battery and a power generation apparatus (e.g., the fuel cell) serving as the distributed power sources for supplying the power which cannot be sold.

Figure 1:
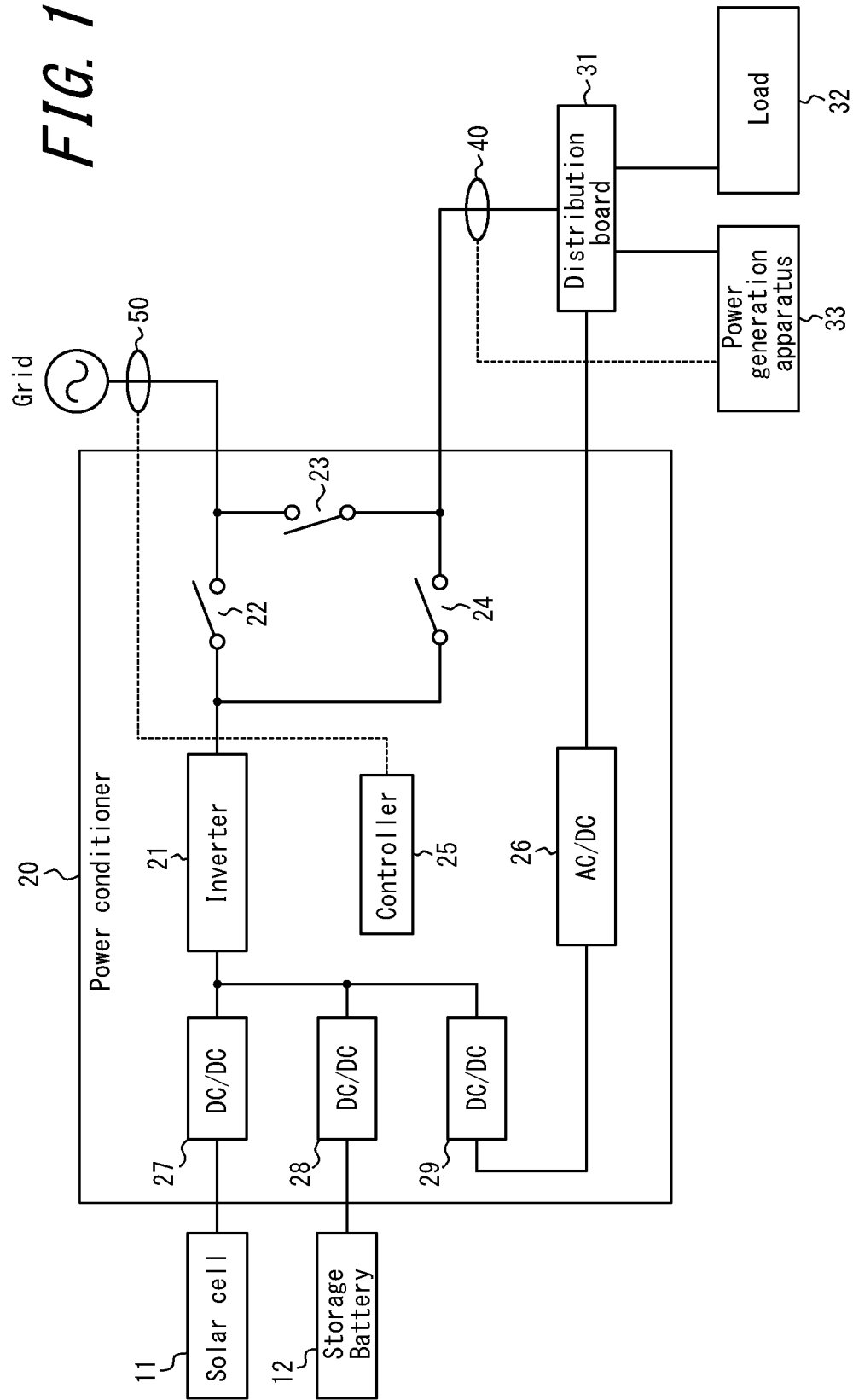
FIG. 1 is a block diagram illustrating a power supply system according to one embodiment.

FIG. 1 is a block diagram illustrating a schematic configuration of the power supply system according to one embodiment. The power supply system according to the present embodiment includes a solar cell 11, a storage battery 12, a power conditioner (a power supply apparatus) 20, a distribution board 31, a load 32, a power generation apparatus 33, a current sensor 40, and a current sensor 50. The power supply system normally performs an interconnection operation with a grid and supplies power from the grid and power from each of the distributed power sources (the solar cell 11, the storage battery 12, and the power generation apparatus 33) to the load 32. The power supply system, when there is no power supply from the grid due to power outage and the like, performs a grid-independent operation for supplying power from each of the distributed power sources (the solar cell 11, the storage battery 12, and the power generation apparatus 33) to the load 32. Also, when a charging rate of the storage battery 12 is equal to or lower than a predetermined threshold, the storage battery 12 is charged with the power generated by the solar cell 11 and/or the power generated by the power generation apparatus 33. Note that, when the power supply system is performing the grid-independent operation, each of the distributed power sources (the solar cell 11, the storage battery 12, and the power generation apparatus 33) is out of parallel connection to the grid. When the power supply system is performing the interconnection operation, each of the distributed power sources (the solar cell 11, the storage battery 12, and the power generation apparatus 33) is in parallel connection to the grid. In FIG. 1, solid lines represent power flow, and broken lines represent flow of control signals or communicated information. Note that some broken lines connecting between a controller 25 and other elements are omitted for the purpose of clarifying the figure (e.g., a broken line connecting between the controller 25 and an interconnection relay 22 is omitted).

The solar cell 11 converts solar energy into DC power. The solar cell 11 is configured with, for example, power generation units having photoelectric conversion cells and connected in a matrix form and to output a predetermined DC current (e.g., 10A). The solar cell 11 is a silicon-based polycrystalline solar cell, a silicon-based single-crystal solar cell, CIGS such as a thin-film solar cell, or the like but not limited thereto, as long as being capable of performing photoelectric conversion.

The storage battery 12 is a storage battery such as a lithium-ion battery and a nickel hydrogen battery. The storage battery 12 may supply power by discharging charged power. The storage battery 12 may be charged with, in addition to the power supplied from the grid and the solar cell 11, the power supplied from the power generation apparatus 33, as described later.

The power conditioner (the power supply apparatus) 20 is interconnected to the grid together with the power generation apparatus 33 and controls the solar cell 11 and the storage battery 12. The power conditioner 20 converts DC power supplied from the solar cell 11 and the storage battery 12 and AC power supplied from the grid and the power generation apparatus 33, and controls switchover between the interconnection operation and the grid-independent operation. The power conditioner 20 includes an inverter 21, an interconnection relay (a first relay) 22, a bypass relay (a second relay) 23, a grid-independent relay (a third relay) 24, the controller 25, an AC-DC converter 26, and DC-DC converters 27 to 29. The bypass relay 23 may be disposed outside the power conditioner 20.

The inverter 21 is a bi-directional inverter and converts the DC power supplied from the solar cell 11 and the storage battery 12 respectively via the DC-DC converter 27 and DC-DC converter 28 into AC power, and converts the AC power supplied from the grid into DC power.

The interconnection relay 22 is configured to switch on/off based on a control signal from the controller 25. The interconnection relay 22 switches on/off a connection between the inverter 21 and the grid. The interconnection relay 22 is switched off at the time of power outage of the grid such that the power conditioner 20 becomes out of parallel connection to the grid, or switched on for the interconnection operation with the grid. When the grid recovers from the power outage, the interconnection relay 22 is switched on after the bypass relay 23 is switched on.

The bypass relay 23 is switched on/off based on a control signal from the controller 25. The bypass relay 23 switches on/off a connection between the grid and the distribution board 31. That is, the bypass relay 23 switches on/off a connection between the grid and the power generation apparatus 33. The bypass relay 23 is switched off at the time of power outage of the grid, or switched on for the interconnection operation with the grid. At the time of recovery of the grid from the power outage, the bypass relay 23 is switched on after the grid-independent relay 24 is switched off.

The grid-independent relay 24 is configured to switch on/off based on a control signal from the controller 25. The grid-independent relay 24 switches on/off a connection between the inverter 21 and the distribution board 31. That is, the grid-independent relay 24 switches on/off a connection between the inverter 21 and the power generation apparatus 33. The grid-independent relay 24 is switched on at the time of power outage of the grid, or switched off for the interconnection operation with the grid. At the time of recovery of the grid, the grid-independent relay 24 is switched off.

The controller 25 is configured with, for example, a microcomputer and, based on a state of the grid and the like, controls the inverter 21, the interconnection relay 22, the bypass relay 23, the grid-independent relay 24, the AC-DC converter 26, the DC-DC converters 27 to 29, and the like. Control of each unit performed by the controller 25 based on the state of the grid will be described later.

The AC-DC converter 26 converts the AC power generated by the power generation apparatus 33 into DC power and supplies the DC power to the storage battery 12 via the DC-DC converters 29 and 28. The AC-DC converter 26, during the grid-independent operation, supplies the power generated by the power generation apparatus 33 to the storage battery 12 so as to charge the storage battery 12. Note that the AC-DC converter 26 may be disposed outside the power conditioner 20. In this case, the power conditioner 20 includes an input terminal to receive the DC power from the AC-DC converter 26 disposed outside.

The DC-DC converters 27 to 29 perform DC-DC conversion on a DC voltage, which has been input, into a predetermined DC voltage.

The DC-DC converter 27 boosts or steps down the DC voltage input from the solar cell 11 to a voltage within a predetermined range and supplies the DC voltage to the inverter 21.

The DC-DC converter 28 boosts or steps down the DC voltage from the storage battery 12 to a voltage within a predetermined range and supplies the DC voltage to the inverter 21. The DC-DC converter 28 is a bi-directional DC-DC converter and boosts or steps down the DC power supplied from the inverter 21, the DC-DC converter 27, or the DC-DC converter 29 to a voltage within a predetermined range and supplies the DC voltage to the storage battery 12.

The DC-DC converter 29 boosts or steps down the DC voltage from the AC-DC converter 26 to a voltage within a predetermined range and supplies the DC voltage to the DC-DC converter 28.

The power generation apparatus 33 is configure with, for example, a fuel cell. The fuel cell includes a cell for using hydrogen and thereby generating DC power from a chemical reaction of hydrogen and oxygen in the air, an inverter for converting the DC power into AC power at 100V or 200V, and other auxiliary elements. Here, the fuel cell serving as the power generation apparatus 33 is a system capable of supplying the AC power to the load 32 without passing the AC power through the power conditioner 20. Therefore, the fuel cell does not necessarily need to be designed for a connection to the power conditioner 20 but may be a versatile system.

The power generation apparatus 33 generates power while a current sensor 40 corresponding thereto is detecting a forward power flow (a current in a power purchasing direction) and performs, when generating power, a load-following operation for following power consumption of the load 32 or a rated operation at a predetermined rated power value. A following range for the load-following operation is, for example, 200 to 700 W, and the rated power value for the rated operation is, for example, 700 W. Note that the power generation apparatus 33 may perform the load-following operation (e.g. 200 to 700 W) for following the power consumption of the load 32 during the interconnection operation, and the load-following operation or the rated operation at the rated power value during the grid-independent operation.

The current sensor 40 detects a current flowing to the distribution board 31. The current sensor 40 is configured with, for example, CT (Current Transformer). The power generation apparatus 33 starts operating when the current sensor 40 detects the current flowing to the distribution board 31. When the current sensor 40 does not detect the current flowing to the distribution board 31, the power generation apparatus 33 stops operating.

The current sensor 50 is arranged between the power conditioner 20 and the grid and detects whether the current is flowing from the power conditioner 20 to the grid, i.e., whether a reverse power flow has occurred. Since the reverse power flow of the power generated by the power generation apparatus 33 to the grid is unauthorized, the controller 25 of the power conditioner 20, when the reverse power flow has occurred, stops the AC-DC converter 26 from operating.

Referring to FIG. 2 to FIG. 5, next, control performed in each state from when the grid-independent operation is performed due to the power outage of the grid to when the interconnection relay 22 is switched on due to recovery of the grid from the power outage will be described.

Grid-Independent Operation

Figure 2:
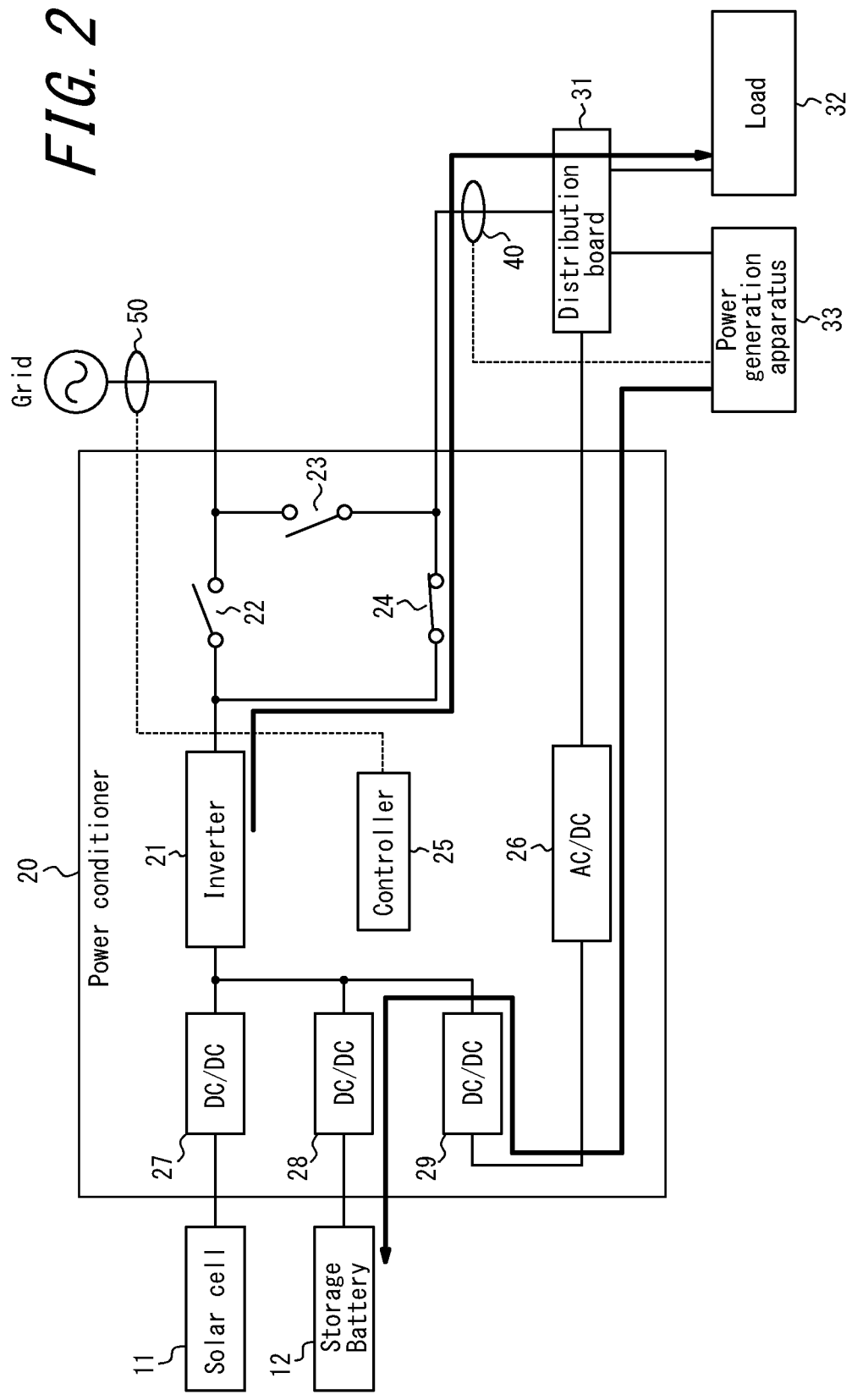
FIG. 2 is a diagram illustrating an example of control of the power supply system during a grid-independent operation.

FIG. 2 is a diagram illustrating an example of the control of the power supply system during the grid-independent operation. In order to perform the grid-independent operation due to the power outage of the grid or the like, the controller 25 controls such that the interconnection relay 22 and the bypass relay 23 are switched off and that the grid-independent relay 24 is switched on. Bold arrows illustrated in FIG. 2 represent power supply.

As illustrated in FIG. 2, during the grid-independent operation, the power conditioner 20 supplies power to the load 32. At this time, since the current sensor 40 detects the current flowing to the distribution board 31, the power generation apparatus 33 generates power performing the load-following operation. The distribution board 31 supplies the power generated by the power generation apparatus 33 to the load 32 and supplies excess power exceeding the power consumption of the load 32 to the AC-DC converter 26 of the power conditioner 20. The excess power is converted into DC power by the AC-DC converter 26 and then supplied to the storage battery 12. Thereby, the storage battery 12 is charged.

Recovery of Grid from Power Outage

Figure 3:
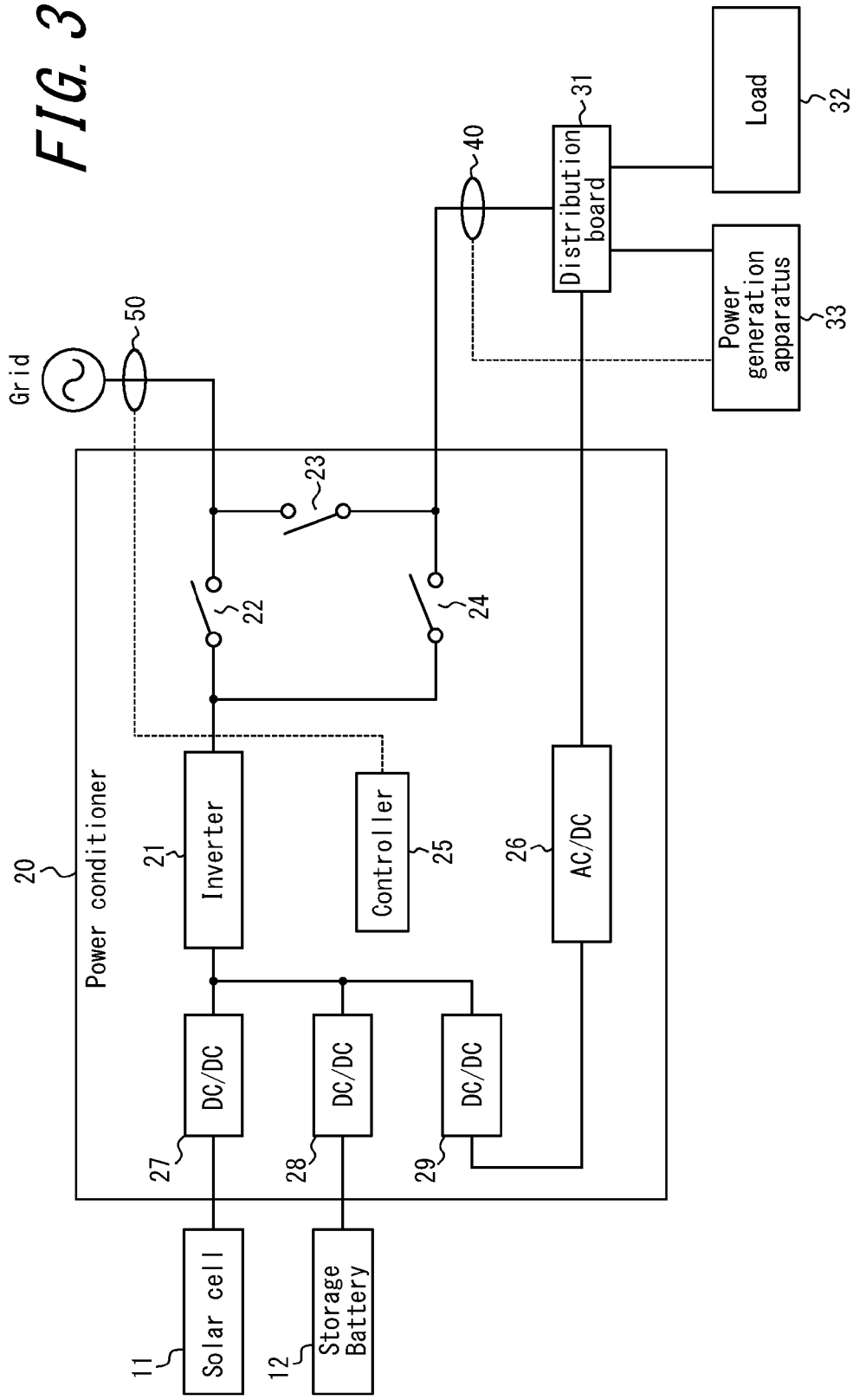
FIG. 3 is a diagram illustrating an example of control of the power supply system at the time of recovery of a grid from power outage.

FIG. 3 is a diagram illustrating an example of the control of the power supply system conducted at the time of recovery of the grid from the power outage when the grid-independent operation is being performed. The controller 25, when detecting the recovery of the grid from the power outage, controls such that the grid-independent relay 24 is switched off to stop the grid-independent operation.

Also, the controller 25, in synchronization with switching-off of the grid-independent relay 24, stops the AC-DC converter 26 from operating. Thereby, the power generated by the power generation apparatus 33 stops being supplied to the storage battery 12, and the charging of the storage battery 12 stops.

When the grid-independent relay 24 is switched off, the current stops flowing from the solar cell 11 to the distribution board 31. Therefore, the current sensor 40 stops detecting the current flowing to the distribution board 31, and the power generation apparatus 33 stops operating.

When Bypass Relay is ON

Figure 4:
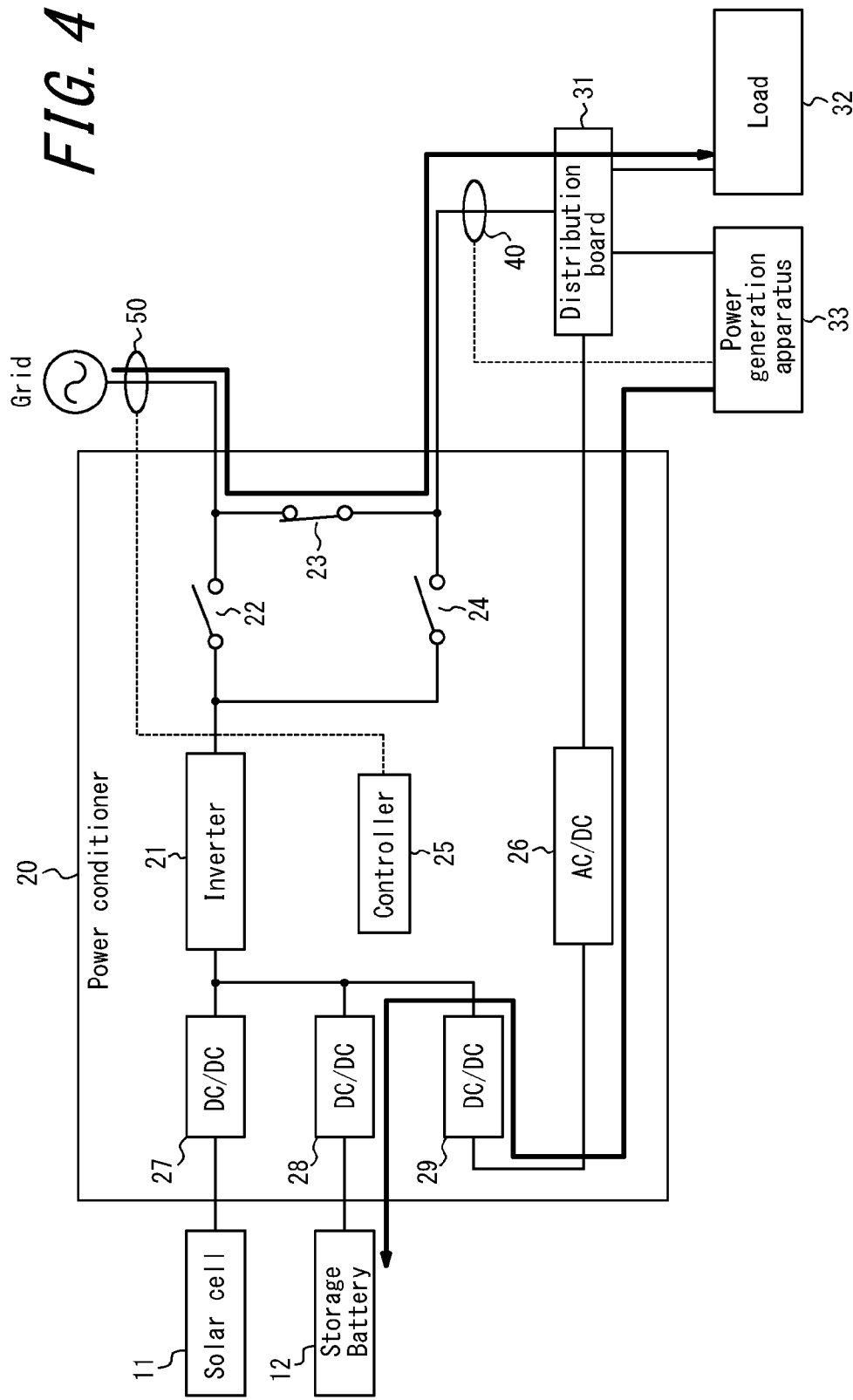
FIG. 4 is a diagram illustrating an example of control of the power supply system after the recovery of the grid from the power outage.

FIG. 4 is a diagram illustrating a state in which, after the recovery of the grid from the power outage, the controller 25 controls such that the grid-independent relay 24 is switched off and then that the bypass relay 23 is switched on. Bold lines illustrated in FIG. 4 represents the power supply.

As illustrated in FIG. 4, when the bypass relay 23 is switched on, the power is supplied from the grid to the load 32. At this time, since the current sensor 40 detects the current flowing to the distribution board 31, the power generation apparatus 33 starts generating power performing the load-following operation.

When the charging rate of the storage battery 12 is equal to or lower than the predetermined threshold, the controller 25 switches the AC-DC converter 26 on. Thereby, the storage battery 12 may be charged with the power generated by the power generation apparatus 33.

The distribution board 31 supplies the power generated by the power generation apparatus 33 to the load 32 and the excess power exceeding the power consumption of the load 32 to the AC-DC converter 26 of the power conditioner 20. The excess power is converted into the DC power by the AC-DC converter 26 and then supplied to the storage battery 12.

When Interconnection Relay is ON

Figure 5:
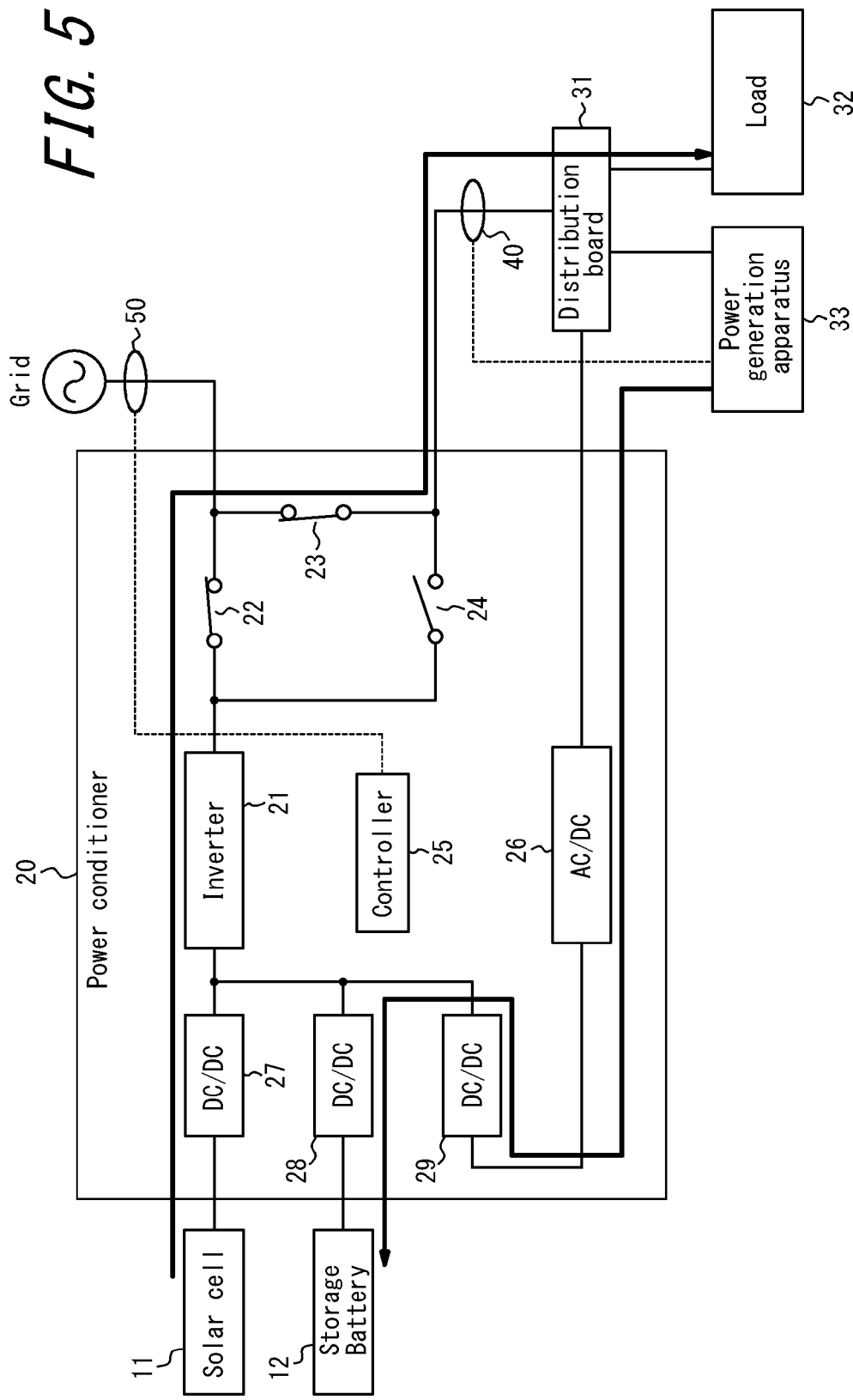
FIG. 5 is a diagram illustrating an example of control at the time of start of an interconnection operation.

FIG. 5 is a diagram illustrating a state in which, after the recovery of the grid from the power outage, the controller 25 controls such that the grid-independent relay 24 is switched off, that the bypass relay 23 is switched on, and then that the interconnection relay 22 is switched on. Bold arrows illustrated in FIG. 5 represent the power supply.

As illustrated in FIG. 5, when the interconnection relay 22 is switched on, the solar cell 11 interconnects to the grid and, together with the grid, supplies power to the load 32.

In this case, the power generation apparatus 33 may operate until the reverse power flow to the grid occurs. Therefore, when the charging rate of the storage battery 12 is equal to or lower than the predetermined threshold, the power supply from the power generation apparatus 33 to charge the storage battery 12 is maintained.

Upon acquiring, from the current sensor 50, information that the reverse power flow to the grid has occurred, the controller 25 stops the AC-DC converter 26 from operating. That is, the controller 25 maintains the AC-DC converter 26 operating until the reverse power flow to the grid is detected.

Figure 6:
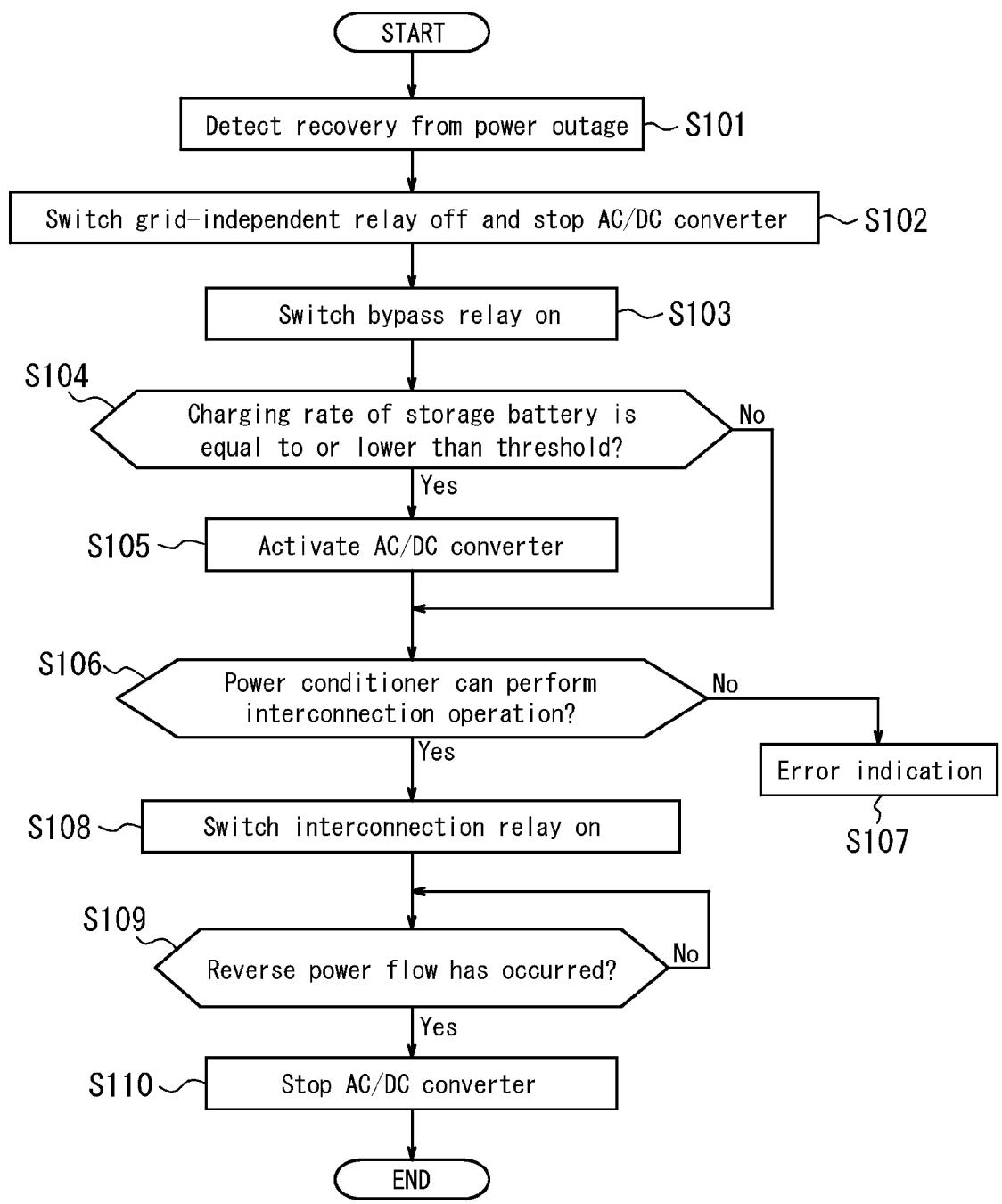
FIG. 6 is a flowchart illustrating an example of an operation of the power supply system according to one embodiment.

Referring to a flowchart illustrated in FIG. 6, next, the operation of the power supply system according to one embodiment will be described. Note that the flowchart illustrated in FIG. 6 starts when, due to the power outage of the grid, the power supply system is performing the grid-independent operation.

Upon detection of the recovery of the grid from the power outage (step S101), the controller 25 of the power conditioner 20 controls such that the grid-independent relay 24 is switched off and that, in synchronization therewith, the AC-DC converter 26 stops operating (step S102). Because the grid-independent relay 24 is switched off, the power is not supplied from the solar cell 11 to the distribution board 31 and, therefore, the power generation apparatus 33 stops operating.

After controlling such that the grid-independent relay 24 is switched off, the controller 25 controls such that the bypass relay 23 is switched on (step S103). Thereby, the power from the grid is supplied to the distribution board 31, and the power generation apparatus 33 is activated.

The controller 25 determines whether the charging rate of the storage battery 12 is equal to or lower than the predetermined threshold (step S104).

When determining as "Yes" at step S104, the controller 25 activates the AC-DC converter 26 to charge the storage battery 12 with the power generated by the power generation apparatus 33 (step S105). When determining as "No" at step S104, the controller 25 determines that there is no need to charge the storage battery 12 and leaves the AC-DC converter 26 inactive.

The controller 25 determines whether the power conditioner 20 can operate interconnecting to the grid (step S106).

When determining as "No" at step S106, the controller 25 instructs the power conditioner 20 to indicate an error (step S107). When determining as "Yes" at step S106, the controller 25 controls such that the interconnection relay 22 is switched on to interconnect the power conditioner 20 to the grid (step S108).

The controller 25 periodically monitors the information from the current sensor 50 and determines whether the reverse power flow to the grid has occurred (step S109).

Upon determining that the reverse power flow has occurred at step S109, the controller 25 stops the AC-DC converter 26 from operating (step S110).

According to the present embodiment, as described above, after the recovery of the grid from the power outage and the interconnection relay 22 is switched on, the AC-DC converter 26 is instructed to keep operating until the reverse power flow occurs, such that the storage battery 12 is charged with the power generated by the power generation apparatus 33. Therefore, at the time of recovery of the grid from the power outage, the power generated by the power generation apparatus 33 may be effectively utilized.

According to the present embodiment, further, at the time of recovery of the grid from the power outage, the grid-independent relay 24 is switched off, the bypass relay 23 is switched on, the AC-DC converter 26 is activated, and then the interconnection relay 22 is switched on. Then, until the reverse power flow occurs, the AC-DC converter 26 keeps operating such that the storage battery 12 is charged with the power generated by the power generation apparatus 33. Since a control sequence is clarified as described above, reliability of the power supply system may be enhanced.

Although the disclosure has been described based on the figures and the embodiment, it is to be understood that various modifications and changes may be implemented based on the disclosure by those who are ordinarily skilled in the art. Accordingly, such modifications and changes are included in the scope of the disclosure. For example, functions and the like included in each constituent, step and the like may be rearranged without logical inconsistency, so as to combine a plurality of constituents or steps together or to separate them.

Although in the present embodiment the power generation apparatus 33 is configured with the fuel cell by way of example, the power generation apparatus 33 is not limited to the fuel cell. The disclosure is applicable also to a distributed power source other than the fuel cell.

Further, although in the present embodiment the controller 25 uses the current sensor 50 to detect the reverse power flow, a detection method is not limited thereto. The controller 25 may detect the reverse power flow by using a current sensor provided elsewhere or by employing another method.

Many aspects of the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), an electronic notepad, a laptop computer, and other programmable data processing apparatuses. Note that in the embodiment the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a controller, a microcontroller, an electronic apparatus, and other apparatuses designed to be capable of executing the functions described herein, and/or a combination thereof. The embodiment presented herein is implemented by, for example, hardware, software, firmware, middleware, a microcode, or any combination thereof.

Also, a machine-readable non-transitory storage medium used herein may include a solid state memory or a tangible carrier (medium) readable by the computer such as a magnetic disk and an optical disk, and stores an appropriate set of computer instructions such as program modules and a data structure those for causing the processor to execute the technique disclosed herein. The computer-readable medium includes an electric connection with at least one wiring, a magnetic disk storage media, other magnetic or optical storage devices (e.g., a CD (Compact Disk), DVD (Digital Versatile Disc), Blu-ray Disc, a portable computer disk, RAM (Random Access Memory), ROM (Read-Only Memory), a ROM such as an EPROM, an EEPROM, or a flash memory that is rewritable and programmable), other tangible storage media capable of storing information, or any combination thereof. The memory may be provided inside and/or outside the processor/processing unit. As used herein, the term "memory" refers to all types of a long-term memory, a short-term memory, a volatile memory, a non-volatile memory, and other memories. A type of the memory, the number of memories, and a type of the medium to store the information are not limited.

REFERENCE SIGNS LIST 11 solar cell
12 storage battery
20 power conditioner (power supply apparatus)
21 inverter
22 interconnection relay (first relay)
23 bypass relay (second relay)
24 grid-independent relay (third relay)
25 controller
26 AC-DC converter
27, 28, 29 DC-DC converter
31 distribution board
32 load
33 power generation apparatus
40 current sensor
50 current sensor

The invention claimed is:

1. A power supply apparatus interconnected to a grid together with a power generation apparatus, and configured to control a solar cell and a storage battery, the power supply apparatus comprising:
an inverter configured to convert DC power from the solar cell and the storage battery into AC power;
a first relay configured to switch on or off a connection between the inverter and the grid;
an AC-DC converter capable of converting AC power from the power generation apparatus into DC power and supplying the DC power to the storage battery during a grid-independent operation; and
a controller configured to control, at the time of recovery of the grid from power outage, such that the AC-DC converter starts operating, that the first relay is switched on, and that the AC-DC converter keeps operating until a reverse power flow to the grid is detected.

2. The power supply apparatus according to claim 1, further comprising:

a second relay configured to switch on or off a connection between the grid and the power generation apparatus; and
a third relay configured to switch on or off a connection between the inverter and the power generation apparatus, wherein
the controller, at the time of recovery of the grid from the power outage, switches the third relay off and the second relay on, activates the AC-DC converter, and then switches the first relay on.

3. The power supply apparatus according to claim 2, wherein the controller, at the time of recovery of the grid from the power outage, switches the third relay off and then switches the second relay on.

4. The power supply apparatus according to claim 2, wherein the controller, when a charging rate of the storage battery is greater than a predetermined threshold at the time of switching the second relay on, leaves the AC-DC converter inactive.

5. The power supply apparatus according to claim 1, wherein the controller uses a current sensor provided between the power supply apparatus and the grid to detect the reverse power flow to the grid.

6. The power supply apparatus according to claim 1, wherein the controller, at the time of recovery of the grid from the power outage, stops the AC-DC converter from operating in synchronization with switching-off of the third relay.

7. The power supply apparatus according to claim 1, wherein the controller, when detecting the reverse power flow to the grid, stops the AC-DC converter from operating.

8. The power supply apparatus according to claim 1, wherein the power generation apparatus is a fuel cell.

9. A power supply system interconnected to a grid comprising:
a power generation apparatus, a solar cell, a storage battery, and a power supply apparatus, wherein
the power supply apparatus is provided with
an inverter configured to convert DC power from the solar cell and the storage battery into AC power,
a first relay configured to switch on or off a connection between the inverter and the grid,
an AC-DC converter capable of converting AC power from the power generation apparatus into DC power and supplying the DC power to the storage battery during an grid-independent operation, and
a controller configured to control, at the time of recovery of the grid from power outage, such that the AC-DC converter starts operating, that the first relay is switched on, and that the AC-DC converter keeps operating until a reverse power flow to the grid is detected.

10. The power supply system according to claim 9, wherein the power generation apparatus generates power while a current sensor that detects a current flow to a load is detecting a forward power flow.

11. The power supply system according to claim 9, wherein the power generation apparatus, during an interconnection operation, performs a load-following operation that follows power consumption of the load.

12. A control method of a power supply apparatus interconnected to a grid together with a power generation apparatus, and configured to control a solar cell and a storage battery, the control method comprising:

at the time of recovery of the grid from power outage,
a step of converting AC power from the power generation apparatus into DC power and supplying the DC power to the storage battery;
a step of switching on a connection between an inverter that converts DC power from the solar cell and the storage battery into AC power and the grid; and
a step of controlling so as to maintain an operation to convert the AC power from the power generation apparatus into the DC power until a reverse power flow to the grid is detected.

* * * * *